(12) United States Patent
Engle

(10) Patent No.: US 7,278,745 B2
(45) Date of Patent: Oct. 9, 2007

(54) METHOD AND APPARATUS FOR ADJUSTING RELATIVE DISPOSITION OF PROJECTION OPTICS BASED ON OPERATING CONDITIONS

(75) Inventor: T. Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 210 days.

(21) Appl. No.: 11/020,074

(22) Filed: Dec. 21, 2004

(65) Prior Publication Data

US 2006/0132729 A1    Jun. 22, 2006

(51) Int. Cl.
G03B 21/00 (2006.01)
G03B 21/14 (2006.01)
G03B 21/16 (2006.01)
G03B 21/18 (2006.01)

(52) U.S. Cl. .................. 353/69; 353/122; 353/52

(58) Field of Classification Search ............... 353/37, 353/52, 69, 76, 101
See application file for complete search history.

(56) References Cited

U.S. PATENT DOCUMENTS

| | | | |
|---|---|---|---|
| 4,907,021 A * | 3/1990 | Yabu ..................... | 353/101 |
| 5,434,632 A * | 7/1995 | Carmichael ............ | 353/101 |
| 6,280,037 B1 * | 8/2001 | Smith .................... | 353/31 |
| 2002/0118966 A1 * | 8/2002 | Hofer et al. ........... | 396/79 |
| 2005/0099607 A1 * | 5/2005 | Yokote et al. .......... | 353/43 |
| 2005/0185142 A1 * | 8/2005 | Fujimori et al. ........ | 353/30 |

* cited by examiner

Primary Examiner—Melissa Jan Koval
Assistant Examiner—Andrew Kong
(74) Attorney, Agent, or Firm—Schwabe Williamson & Wyatt

(57) ABSTRACT

A system, method, and apparatus for sensing an operational condition of a projection device and generating a signal to be used in the adjustment of the relative disposition of a component of the projection device, are disclosed herein.

19 Claims, 3 Drawing Sheets

METHOD AND APPARATUS FOR ADJUSTING RELATIVE DISPOSITION OF PROJECTION OPTICS BASED ON OPERATING CONDITIONS

FIELD OF THE INVENTION

Disclosed embodiments of the present invention relate to the field of projection systems, and more particularly to adjusting the relative disposition of projection optics based on operational conditions.

BACKGROUND OF THE INVENTION

Rear-projection displays (RPDs) have become a popular technology for applications where a self-contained, large-screen display is required, for example rear-projection televisions (RPTs). RPTs are generally available with larger screen sizes than cathode ray tube (CRT) displays due to limitations inherent in the manufacture of large CRTs. More recently, RPDs have also found increased popularity for use in smaller applications, such as monitors.

An RPD includes many individual components that cooperate to display an image for a viewer. For example, a typical RPD has a body or cabinet housing a translucent screen, a light valve, light source, and projection optics. The light source illuminates the light valve, which modulates the light based on image data provided from an input device. The projection optics then project the image output from the light valve onto the screen for display.

During operation the components of an RPD create a significant amount of heat within the cabinet. This heat may cause a number of things to happen that ultimately affects the quality of the image of the light valve displayed at the screen. Increased heat may cause thermal drift between the system components due to physical expansion/contraction of the chassis that holds the components relative to one another. Heat may also have a thermalizing effect on the shape and/or index of refraction of lens elements of the projection optics.

Many design attempts have been presented in the prior art to try to mitigate the effects of thermal cycling within projection systems. One example includes a heater to preheat the components prior to operation in order to create a thermally constant environment. Another example consists of a design of combinations of positive and negative lens elements in an attempt to compensate for the thermalizing effect. However, any mitigative effect provided by these prior art designs falls short of compensating for the thermal cycling experienced throughout the life cycle of a typical projection system.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION

Illustrative embodiments of the present invention include a projection device having a sensor to generate a signal, based at least in part upon sensed operating conditions, to be used in adjusting the relative positioning of components within the projection device, and methods practiced thereon.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments. In particular, a wide variety of optical components such as prisms, mirrors, lenses, integration elements, etc. may be used as appropriate to fold, bend, or modify the illumination for the intended application. Integration of these optical components into illustrated embodiments may not be specifically addressed unless it is necessary to develop relevant discussion of embodiments of the present invention.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
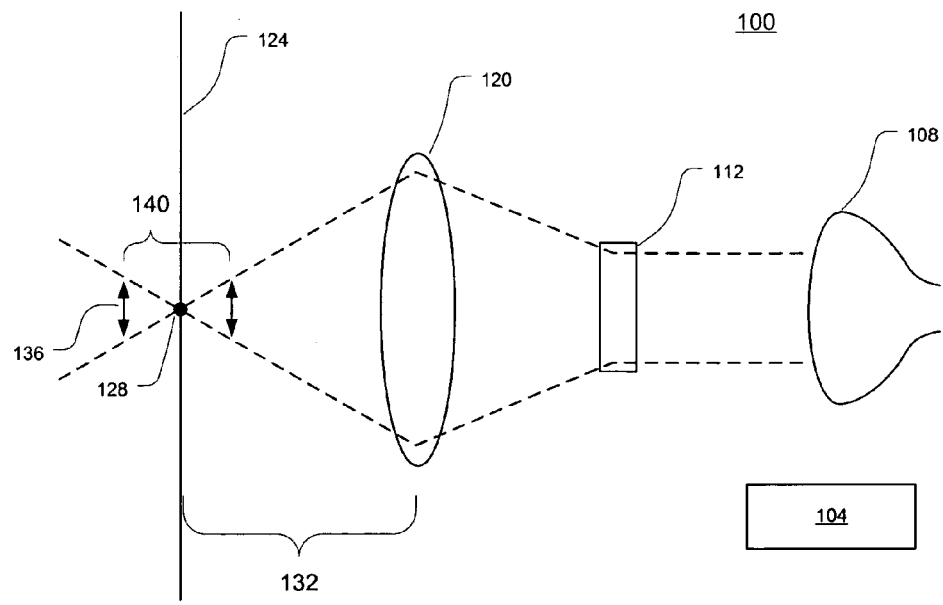
FIG. 1 illustrates a simplified schematic view of a projection device having a sensor to sense operating conditions within the projection device, in accordance with an embodiment of this invention.

FIG. 1 illustrates a simplified schematic diagram of a projection device 100 having a sensor 104 to sense operating conditions within the projection device, in accordance with an embodiment of this invention. The projection device 100 may include an illumination arrangement 108 to provide light to a light valve 112. The light valve 112 may modulate the received light in a manner to effectuate the output of a desired image. The desired image may be conveyed to the projection device 100 from an input device. The conveyed image may be, for example, image frames of a video.

For the purpose of this description, a still image may be considered as a degenerate or special video where there is only one frame. Accordingly, both still image and video terminologies may be used in the description to follow, and they are not to be construed to limit the embodiments of the present invention to the rendering of one or the other.

The image output from the light valve 112 may be conveyed by image rays travelling along a projection path and projected through projection optics 120 onto a viewing mechanism such as, but not limited to, a screen 124.

Each of the components discussed herein may represent a wide range of devices designed to perform the component's respective function. For example, the illumination arrangement 108 may include a light source optically coupled to a series of illumination optics to process the illumination. The light source may be a polychromatic light source such as, but not limited to, an incandescent lamp (e.g., tungsten halogen) or a gaseous discharge lamp (e.g., a metal halide). In other embodiments, monochromatic light sources such as light-emitting diodes (LEDs), for example, may be used to produce light of a particular color. The illumination optics may include, but are not limited to, illumination lenses, integration devices, filters, and/or light-directing components (e.g., mirrors, prisms, light guides, etc.) designed to provide the illumination with the desired uniformity, angle, aspect ratio, color, and/or brightness to the light valve 112.

The light valve 112 may include, but is not limited to, a digital micromirror device (DMD), a reflective liquid crystal on semiconductor (LCOS) device, and a liquid crystal device (LCD). In one embodiment, the light valve 112 may be sequentially illuminated with primary colors from the illumination arrangement 108 in a frame sequential modulation (FSM) manner. In various embodiments, the projection device 100 may also include more than one light valve 112. For example, a color-specific light valve may be placed in each of a number of primary colored paths and be used to exclusively modulate the light of these paths. In these embodiments, the illumination arrangement 108 may include optics to facilitate the presentation of colored light to the appropriate light valves along the appropriate illumination paths.

In various embodiments, the input device may include a personal or laptop computer, a digital versatile disk (DVD), a set-top box (STB), a video camera, a video recorder, an integrated television tuner, or any other suitable device to transmit signals, e.g., video signals, to the projection device 100.

The image rays from the projection optics 120 may converge to a focal point 128 that is a focal distance 132 away from the projection optics 120. As the image rays converge to the focal point 128 their diameter of separation 136 gradually decreases, theoretically to zero. After the focal point 128, and in the absence of the screen 124, the image rays would then diverge with the diameter of separation 136 gradually increasing. The diameters of separation 136 may be symmetrical around the focal point 128. A depth of focus 140 may exist throughout a range of diameters of separation 136 where the image may have a desired focal status. This may sometimes be referred to as the allowable blur circle. If the screen 124 is located within this depth of focus 140 the image may be focused upon the screen 124. Due to the symmetry around the focal point 128, if the focal point 128 is within +/−½ (depth of focus 140) distance to the screen 124, the image may be focused on the screen 124.

The focal distance 132 may be determined by a number of factors, including the number and type of elements that make up the projection optics 120 as well as their relative positioning to one another, and to the light valve 112. Although the focal distance 132 may be largely fixed with the selection and arrangement of the components of the projection device 100, there may be environmental situations experienced during operation that may affect the focal distance 132. These environmental situations may cause focal drift, i.e., changes in the focal distance 132. A significant focal drift may result in the depth of focus 140 drifting beyond the screen 124 resulting in an out-of-focus image at the screen 124.

In one embodiment, the sensor 104 may sense an operational condition related to focal drift. Upon sensing the operational condition, the sensor 104 may output a sensor signal that may be used to counteract the focal drift. This may result in a focused image being achievable throughout a wide range of environmental situations. Additionally, this may result in design opportunities not previously realized due to compromises related to the depth of focus 140 dimension.

Prior art projection devices often choose projection optics having a large depth of focus dimension with the idea that more focal drift could be experienced through operation without resulting in an out-of-focus image. However, projection optics with a large depth of focus dimension may sacrifice a certain amount of light collection efficiency and/or compactness.

The depth of focus 140 dimension may be related to the projection optics' 120 f-number, which is an expression denoting the ratio of the focal distance 132 to the diameter of the entrance pupil. Projection optics with small f-numbers may project light rays that converge, and subsequently diverge, at steeper angles than light rays from projection optics with a large f-number. These steep angles of convergence/divergence result in a relatively narrow depth of focus that is unaccommodating to focal drift. However, other considerations may tend towards the adoption of optics with small f-numbers.

Projection optics having small f-numbers may not only project light rays with steep angles but may also be capable of collecting light rays over a wide range of angles. With regards to the embodiment depicted in FIG. 1, this may facilitate the projection optics 120 collecting light rays from the light valve 112 over a wide range of angles thereby providing for an increased collection efficiency. Additionally, the relative positioning of the projection optics 120 to both the light valve 112 and to the screen 124 may be closer the smaller the f-number, resulting in a more compact projection device 100.

Figure 2:
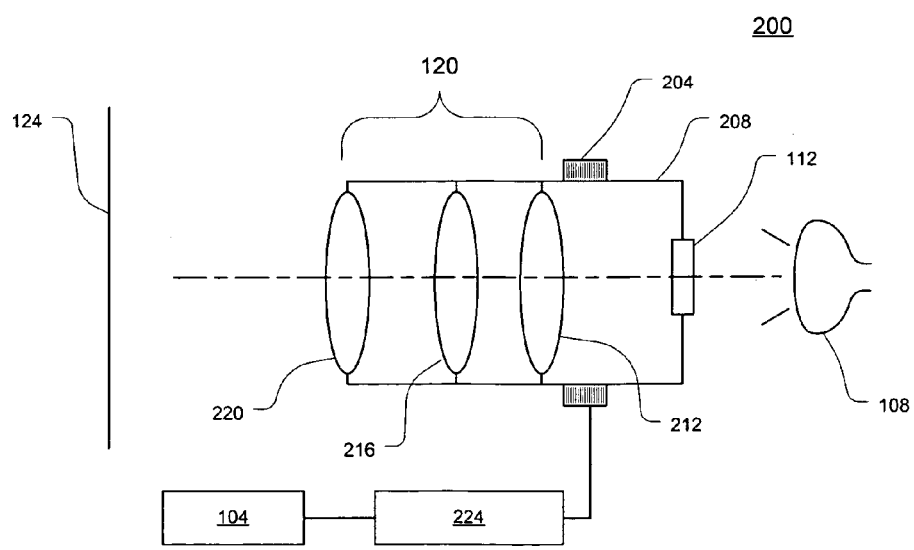
FIG. 2 illustrates a simplified schematic view of a projection device adapted to sense an operational condition relating to a temperature measurement, in accordance with an embodiment of the present invention.

FIG. 2 illustrates a simplified schematic view of a projection device 200 adapted to sense an operational condition and to adjust the relative disposition of a component based, at least in part, upon the sensed condition, in accordance with an embodiment of the present invention. In this embodiment, a mechanical actuator 204 may be coupled to a chassis 208 that provides for the relative disposition of the projection optics 120 and the light valve 112. The projection optics 120 may include an entry lens 212, an intermediate lens 216, and an exit lens 220. The lenses 212, 216, and/or 220 may be simple lenses, i.e., one lens element having two refractive surfaces, or compound lenses, i.e., having more than one lens elements. A mechanical actuator 204 may operate to adjust the focal distance 132 by adjusting the disposition of at least one lens element of the projection optics 120 relative to the light valve 112.

Figure 3:
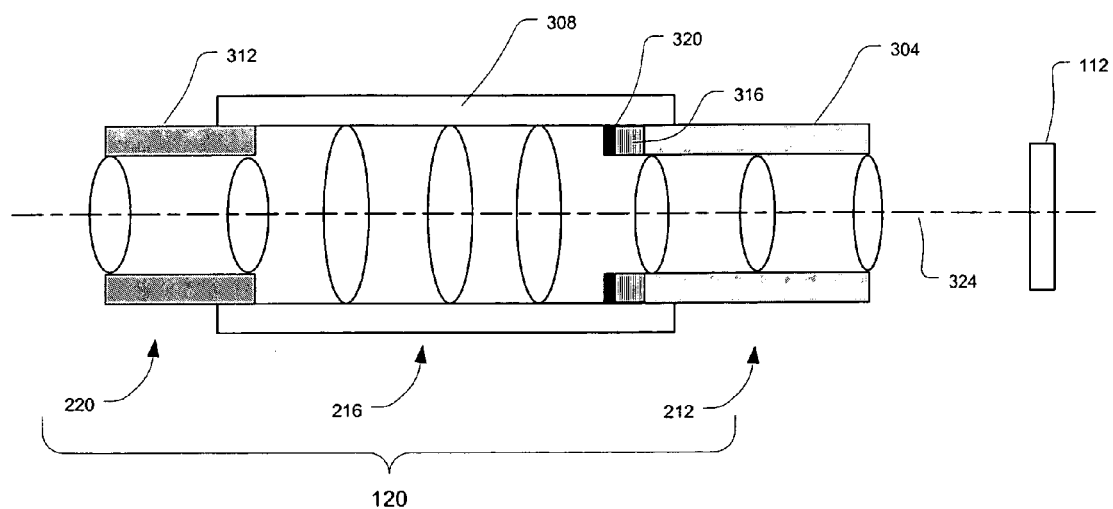
FIG. 3 illustrates a cross-sectional view of projection optics in accordance with one embodiment of the present invention.

FIG. 3 illustrates a cross-sectional view of projection optics 120 in accordance with one embodiment of the present invention. As discussed above, the projection optics 120 may include the entry lens 212, the intermediate lens 216, and the exit lens 220. The lens elements of the lenses 212, 216, and 220 may be respectively disposed in tubes 304, 308, and 312. In this embodiment, the mechanical actuator 204 may include a piezoelectric device 316. One end of the piezoelectric device 316 may be coupled to a brace 320, which is coupled to the tube 308. The other end of the piezoelectric device 316 may be coupled to an end of the tube 304. In one embodiment the piezoelectric device 316 may have a ring-shape that corresponds to the interior diameter of the tube 312 and the end of the tube 308. In other embodiments, the piezoelectric device 316 may include one or more discrete components.

Adjusting the voltage across the piezoelectric device 316 may cause linear motion through expansion/contraction in an axial direction, i.e., parallel to the projection path 324. Adjusting the voltage in this way may cause precise adjustments to the relative disposition of the lens elements of the entry lens 212. In a similar manner, the relative disposition of the Intermediate lens 216, the exit lens 220, and/or the light valve 112 may be adjusted. Additionally, in various embodiments the mechanical actuator 204 may be adapted to adjust the relative positioning of one or more of the individual lens elements.

In various embodiments, the mechanical actuator 204 may include a wide range of devices designed to adjust the relative disposition of components of the projection device 200. For example, the mechanical actuator 204 could include, but is not limited to, a linear motor, a stepper motor, a solenoid, and/or a pneumatic cylinder.

Referring again to FIG. 2, a controller 224 may be coupled to the sensor 104 to receive a sensor signal that is based at least in part upon a sensed operating condition of the projection device 200. The controller 224, which may also be coupled to the mechanical actuator 204, may output a control signal that is based at least in part upon the sensor signal. The control signal may cause the mechanical actuator 204 to adjust the relative disposition of at least one element of the projection optics 120 and the light valve 112.

In one embodiment, the operating condition may be a temperature measurement and the sensor 104 may be a temperature sensor such as, for example, a thermocouple. A correlation between focal drift and the temperature measurement may be stored in a look-up table that is accessible by the controller 224. The correlative data may be generated through empirical analysis performed through operation of a projection device with a similar optical architecture, or it could be the result of computational analysis based on known thermal effects of the components of the projection device 200, e.g., thermal coefficients of the components. The controller 224 may receive the sensor signal representing a temperature measurement, access the look-up table to approximate the focal drift, and output the control signal that is adapted to at least partially counteract this focal drift.

In various embodiments the sensor 104 may be adapted to sense temperature measurements at more than one location. For example, the sensor may position one thermocouple adjacent to the projection optics 120 with another adjacent to the light valve 112.

Figure 4:
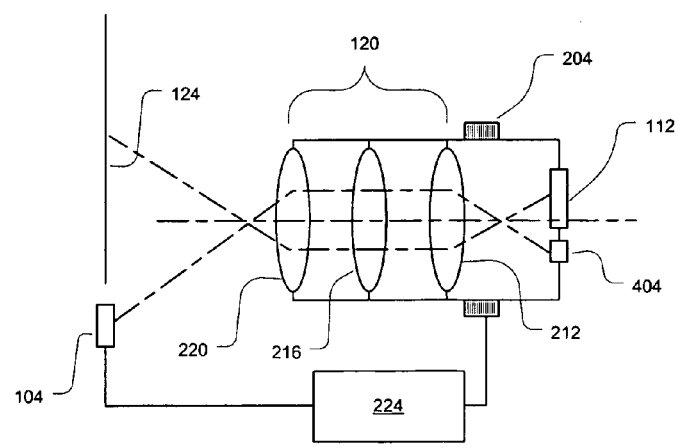
FIG. 4 illustrates a simplified schematic view of a projection device adapted to sense an operational condition relating to a characteristic of a projected image, in accordance with an embodiment of the present invention.

FIG. 4 illustrates a simplified schematic view of a projection device 400 adapted to sense an operational condition relating to a characteristic of a projected image, in accordance with an embodiment of the present invention. In this embodiment, the image of the light valve 112 may be projected onto the screen 124 through the projection optics 120 in a manner similar to the above embodiments. However, in this embodiment an image of a calibration object 404 may also be projected through the projection optics 120. The image of the calibration object 404 may be projected onto the sensor 104. Projecting both the light valve and calibration object images through the same projection optics may correlate the focal characteristics of the two images. For example, in one embodiment, the relative disposition of the components of the projection device 400 may be such that when the image of the calibration object 404 is focused upon the sensor 104, the image of the light valve 112 is focused on the screen 124. Due to this, or a similar, correlation of focal characteristics, the calibration object image may serve as a proxy for the light valve image. Therefore data analysis performed upon the former may give indication as to the status of the latter. Hereinafter the light valve image may also be referred to as the primary image, and the calibration object image may also be referred to as the proxy image.

In this embodiment, the sensor 104 may include an image capture device, and the proxy image may be projected onto a surface of the image capture device, which would then translate the image into electrical impulses of the sensor signal. The image capture device may be, e.g., a charge-coupled device (CCD) having an array of pixels with capacitors capable of detecting the amount of light that is incident upon the pixels and outputting electrical impulses representing that amount.

The sensor signal may be output to the controller 224, which may perform analysis on the sensor signal to determine a focal characteristic of the proxy image. For example, a focal drift may occur that results in the proxy image going out of focus. The controller 224, having determined an out-of-focus shift in the sensor signal, may output control signals to the mechanical actuator 204 that are designed to refocus the proxy image. The controller 224 may receive continual feedback from the sensor 104 to determine whether adjustments made to the relative disposition of the components have put the proxy image back into focus.

Figure 5:
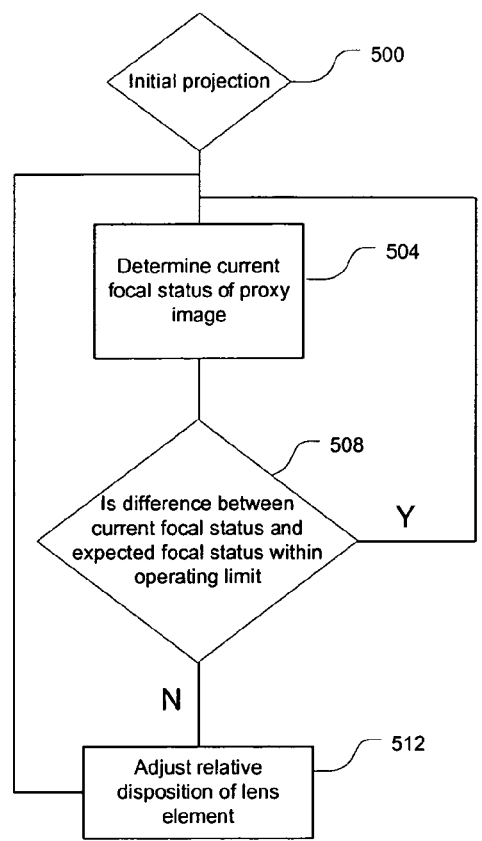
FIG. 5 illustrates a flow diagram of a feedback loop implemented by the projection device according to an embodiment of the present invention.

FIG. 5 illustrates a flow diagram of a feedback loop implemented by the projection device 400 according to an embodiment of the present invention (FIG. 5 reference numbers in parentheses). Upon operation of the projection device 400 both the primary image and the proxy image may be projected through the projection optics 120 (500). The controller 224 may receive the sensor signal and determine the current focal status of the proxy image (504). The controller 224 may then compare the current focal status to an expected focal status of the proxy image (508). If the difference between the current focal status and the expected focal status is within a predetermined operating range, the controller 224 will refrain from actuating the mechanical actuator 204 and after a period of time the current focal status will be updated with more recent proxy image data from the sensor 104. If the difference between the current and expected focal statuses is outside of the operating range, the controller 224 may generate control signals to actuate the mechanical actuator 204 to adjust the relative positioning of components of the projection device 400 (512) and then after a period of time the current focal status will be updated with more recent proxy image data from the sensor 104.

In another embodiment, the controller 224 may generate the control signals based solely on the current focal status of the proxy image without comparing it to an expected focal status.

In one embodiment, the calibration object 404 may include a pattern that is designed to facilitate the focal characteristic analysis that is performed by the controller 224. In one embodiment this pattern may include parallel lines of various widths and spacings. Other embodiments may include patterns having dots, concentric circles. The calibration object 404 may include a backlight source such as, but not limited to, an LED.

As depicted in FIG. 4, the calibration object 404 is distinct from the light valve; however, in other embodiments the calibration object 404 may be a part of the light valve 112. In some embodiments, such as a rear-projection television (RPT), the image of the light valve 112 is projected in a manner to overfill the screen 124. Therefore, in this embodiment, the sensor 104 may be placed adjacent to the screen 124 and the calibration object 404 may be a portion of the perimeter of the light valve 112.

As depicted, the primary image may exit the projection optics with an upward trajectory, while the proxy image may exit the projection optics with a downward trajectory; however, other embodiments may have other trajectories. For example, in another embodiment the proxy image and the proxy image may exit the projection optics 120 with the same angular trajectory.

Figure 6:
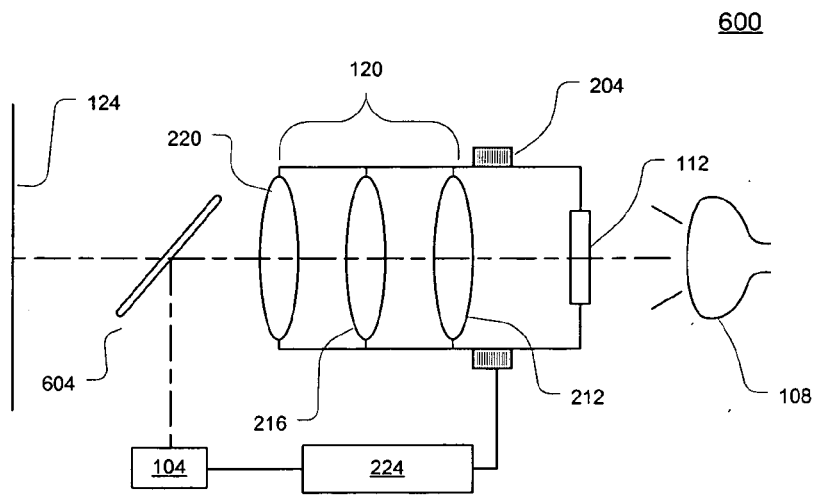
FIG. 6 illustrates a simplified schematic diagram of a projection device employing wavelength selective reflection to reflect the proxy image, in accordance with an embodiment of the present invention.

FIG. 6 illustrates a simplified schematic diagram of a projection device 600 employing wavelength selective reflection to reflect the proxy image, in accordance with an embodiment of the present invention. The illumination arrangement 108 may provide illumination with certain wavelengths designed to carry the primary image, and illumination having other wavelengths to carry the proxy image. For example, in one embodiment the primary image rays may have wavelengths within the visible spectrum, while the proxy image rays may have wavelengths within the infrared (IR) range. The primary image rays and the proxy image rays may be provided to the light valve 112 simultaneously or within respective time frames.

In one embodiment, the illumination arrangement 108 may include a polychromatic light source adapted to emit light over a wide range of wavelengths. The illumination arrangement 108 may have a color modulator with filter segments designed to receive the polychromatic light and transmit color sequential light to the light valve 112. The color modulator may be a color wheel having primary color filters, e.g., red, green, and blue that are designed to emit colored light for modulation into the primary image. In one embodiment, the red filter may be designed to transmit illumination in both the visible red spectrum as well as the invisible infrared spectrum, thereby simultaneously providing the carrier for both the red portion of the primary image and the proxy image.

In another embodiment, monochromatic light sources such as colored LEDs may be used. These embodiments may have light sources that emit light within a relatively narrow spectrum of wavelengths. One embodiment may have primary light sources, e.g., red, green, and blue, that are designed to provide the primary image rays, and a calibration light source that is designed to provide the proxy image light rays. The calibration light source may be activated in its own time frame or, alternatively, activated in a time frame along with one or more of the primary colored light sources.

In this embodiment a dichroic reflector 604 may be optically coupled to the output of the projection optics 120. The dichroic reflector 604 may be adapted to reflect the proxy image rays and transmit the primary image rays. More particularly, in one embodiment the dichroic reflector 604 may be adapted to reflect illumination having wavelengths over 700 nanometers (nm) (which includes the IR spectrum), while transmitting illumination having wavelengths less than 700 nm (which includes the visible spectrum).

The proxy image rays may be reflected towards the image capture device of the sensor 104. An embodiment employing a CCD may be especially sensitive to proxy image rays within the IR spectrum. Similar to the above embodiment described and discussed with reference to FIGS. 4-5, the sensor 104, controller 224, and mechanical actuator 204 may cooperate to adjust the relative disposition of components of the projection device 600 in order to counteract focal drift that may result in the proxy and primary images going out of focus.

The novel aspects discussed and described with respect to the projection devices 100, 200, 400, and 600 from the above embodiments may be used in a variety of applications including, but not limited to, a rear projection display (RPD) and a front-projection display (FPD).

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   a light valve adapted to output a first image;
   a calibration object, positioned adjacent to the light valve, to output a second image;
   projection optics optically coupled to the light valve to project the first image and optically coupled to the calibration object to project the second image, the projection optics having a first lens element relatively disposed away from the light valve;
   a temperature sensor, adapted to sense a temperture of the apparatus, and to generate a first sensor signal based at least in part upon the sensed temperture; and
   a controller adapted to determine a change in focal distance of the projection optics based at least in part upon the sensed temperture, and to generate a control signal based at least in part upon the change in the focal distance for use to adjust the ralative disposition of the first lens element and the light valve.

2. The apparatus of claim 1, comprising:
   a mechanical actuator coupled to at least a selected one of the first lens element or the light valve, to move the selected one(s) to adjust the relative disposition of the first lens element and the light valve, based at least in part on the sensor signal and/or the control signal.

3. The apparatus of claim 1, further comprising:
   an image capture device adapted to receive the second image, and to generate a second sensor signal based at least in part upon the second image.

4. The apparatus of claim 3, wherein the second image has an expected focal status and the controller is further adapted to determine a current focal status for the second image based at least in part upon the second sensor signal, and to generate the control signal based at least in part upon a selected one of the current focal status or a difference between the current and expected focal statuses.

5. The apparatus of claim 4, wherein the first image has an expected focal status that is correlated to the second image's expected focal status.

6. The apparatus of claim 1, wherein the projection optics output the first image in a first direction and the second image in a second direction that is different than the first direction.

7. The apparatus of claim 1, wherein the apparatus further comprises:
a dichroic reflector optically coupled to the projection optics and adapted to transmit the first image and to reflect the second image.

8. The apparatus of claim 7, wherein the second image comprises infrared light.

9. An apparatus comprising:
a light valve adapted to output a first image;
a calibration object, positioned adjacent to the light valve, to output a second image having a current focal status and an expected focal status;
projection optics optically coupled to the light valve and the calibration object to project the first image and the second image, the projection optics having a first lens element relatively disposed away from the light valve;
a sensor adapted to receive the second image, and to generate a sensor signal based at least in part upon the second image; and
a controller adapted to determine the current focal status for the second image based at least in part upon the sensor signal, and to generate a control signal based at least in part upon a selected one of the current focal status or a difference between the current and expected focal statuses, for use to adjust the relative disposition of the first lens element and the light valve.

10. The apparatus of claim 9, further comprising:
a projection device including the light valve, calibration object, projection optics, control and sensor; and
an input device coupled to the projection device, to provide an input signal to the projection device, the first image based at least in part upon the input signal.

11. The apparatus of claim 9, wherein the sensor comprises an image capture device.

12. The apparatus of claim 11, wherein the image capture device comprises a charge-coupled device.

13. The apparatus of claim 9, further comprising:
a mechanical actuator coupled to at least a selected one of the first lens element or the light valve, to move the selected one(s) to adjust the relative disposition of the first lens element and the light valve, based at least in part on the sensor signal and/or the control signal.

14. The apparatus of claim 9, wherein the first image has an expected focal status that is correlated to the second image's expected focal status.

15. The apparatus of claim 9, wherein the calibration object comprises a linear pattern.

16. The apparatus of claim 9, wherein the projection optics output the first image in a first direction and the second image in a second direction that is different than the first direction.

17. The apparatus of claim 9, wherein the apparatus further corn prises:
a dichroic reflector optically coupled to the projection optics and adapted to transmit the first image and to reflect the second image.

18. The apparatus of claim 17, wherein the second image comprises infrared light.

19. The apparatus of claim 9, wherein the light valve and the calibration object are positioned in a common plane.

* * * * *

UNITED STATES PATENT AND TRADEMARK OFFICE
CERTIFICATE OF CORRECTION

PATENT NO. : 7,278,745 B2 Page 1 of 1
APPLICATION NO. : 11/020074
DATED : October 9, 2007
INVENTOR(S) : T. Scott Engle It is certified that error appears in the above-identified patent and that said Letters Patent is hereby corrected as shown below:

Col. 8, lines 35, 37, and 40, claim 1 "…temperture"…" should read --…temperature…--;

Col. 8, line 38, claim 1 "…a change in focal…" should read --…a change in a focal…--;

Col. 8, line 42, claim 1 "…the ralative disposition,…" should read --…the relative disposition…--;

Col. 8, line 44, claim 1 "…2. The apparatus of claim 1, comprising:…" should read --…2. The apparatus of Claim 1, further comprising: …--;

Col. 9, line 29, claim 10 "…control and sensor; and,…" should read --…controller and sensor; and…--;

Col. 10, line 22, claim 17 "…corn prises: …" should read --…comprises: …--.

Signed and Sealed this

Tenth Day of March, 2009

JOHN DOLL
*Acting Director of the United States Patent and Trademark Office*